(12) United States Patent
Sharma

(10) Patent No.: US 7,324,095 B2
(45) Date of Patent: Jan. 29, 2008

(54) PRESSURE-SENSITIVE INPUT DEVICE FOR DATA PROCESSING SYSTEMS

(75) Inventor: Manish Sharma, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 592 days.

(21) Appl. No.: 10/978,878

(22) Filed: Nov. 1, 2004

(65) Prior Publication Data

US 2006/0092139 A1    May 4, 2006

(51) Int. Cl.
*G09G 5/00* (2006.01)
(52) U.S. Cl. ...................... 345/175; 345/173
(58) Field of Classification Search ........ 345/156–158, 345/166, 168, 173–177, 179; 178/18.01, 178/18.03, 18.05, 18.06, 19.01
See application file for complete search history.

(56) References Cited

U.S. PATENT DOCUMENTS

| 5,062,198 A | 11/1991 | Sun |
| 5,305,017 A | 4/1994 | Gerpheide |
| 5,982,302 A * | 11/1999 | Ure ............................ 341/22 |
| 6,002,389 A | 12/1999 | Kasser |
| 6,034,335 A | 3/2000 | Aufderheide et al. |
| 6,441,807 B1 * | 8/2002 | Yamaguchi .................. 345/173 |
| 6,555,235 B1 | 4/2003 | Aufderheide et al. |
| 6,628,269 B2 * | 9/2003 | Shimizu ...................... 345/173 |
| 7,034,806 B2 * | 4/2006 | Nakagawa ................... 345/173 |
| 2004/0090429 A1 * | 5/2004 | Geaghan et al. ............. 345/173 |
| 2004/0119701 A1 | 6/2004 | Mulligan et al. |
| 2005/0146513 A1 * | 7/2005 | Hill et al. .................... 345/173 |

* cited by examiner

*Primary Examiner*—Richard Hjerpe
*Assistant Examiner*—Mansour M. Said

(57) ABSTRACT

Provided is a pressure sensitive input device for data processing systems. In a particular embodiment, the device includes a transferable overlay for placement over a display screen of the system. Rows and columns of parallel conductors, which may be manufactured as ridges, are positioned to cross within the overlay, and are separated by a deformable isolation layer. A current is flowed across the rows and columns. Any change in the distance between the rows and columns, induced by the pressure of a user input, produces a disruption in the current flow. A proportional analog response signal is transmitted to a processor, wherein the signal is used to calculate a location of the user input, and a differential in the input pressure. The device may receive and process multiple, simultaneous inputs at various locations on the overlay. An appropriate method of use for the pressure-sensitive input device is also provided.

34 Claims, 5 Drawing Sheets

PRESSURE-SENSITIVE INPUT DEVICE FOR DATA PROCESSING SYSTEMS

FIELD OF THE INVENTION

This invention relates generally to input devices for data processing systems. More particularly, to the use of analog response signals, generated by a pressure-sensitive input device, to command system functions and operations.

BACKGROUND

The term "data processing system" encompasses much more than just computer systems, and may include tablet PCs, hand-held games, PDAs and cellular phones. As a device for inputting user data and commands into a data processing system, touch input devices, or touch screens, are found on a variety of both large and small systems. For example, touch screens are used in a multitude of commercial applications from bank ATMs to video gaming systems, and may be found on the smallest of cellular phones.

Typically, a touch-sensitive surface responds to contact from a stylus or other means of user input, e.g. a finger. The location of the input on the surface corresponds to a particular control function, command or data input for the data processing system. The touch screen may be physically integrated with a visual display device of the system, such as a computer monitor, or it may be a remotely located touch pad.

Several types of touch screen devices are known in the prior art. Resistive or conductive touch screen devices rely on pressure from a user's touch (the user input) to induce electrical contact between two separated conductive grids or surfaces. The electrical contact completes a circuit, altering a uniform flow of current across the grids. The system detects changes in current flow, and uses the sensed information to determine the X and Y coordinate location of the contact on the surface of the touch screen.

Similarly, a capacitive touch screen device conveys a constant and uniform voltage across a capacitive layer or surface. As the input device, which is itself capacitive, touches the surface, the surface deforms and current is drawn to the input device. Consequently, the charge across the capacitive layer decreases. Sensors located along the periphery of the touch screen measure the decrease in charge, and the system uses the various sensor readings to locate the touch input.

Other touch screen devices known in the prior art include: surface acoustic wave (SAW) devices; visual, infrared or RF transmit/receive systems; and electromagnetic digitizers. With SAW devices, the system transmits an acoustic wave across the touch screen surface. Interruptions in the wave, produced by the touch of a stylus or other input device, are detected and used to locate the touch input.

Transmit/receive systems use RF, visual, or infrared energy to locate a stylus in contact with the touch screen. Specifically, energy is either transmitted or received by a stylus and used to calculate the precise position of the contact. Additionally, electromagnetic digitizers use a stylus that generates an electromagnetic field. The magnetic field emanating from the stylus interacts with one or more magnetic fields in the digitizer. The system uses the corresponding changes in the digitizer fields to locate the stylus contact.

Yet another prior art system includes strain gauges mounted in at least three positions around the periphery of the touch screen. Touch inputs generate strain forces, and multiple sensors measure these forces. The system cross-references and correlates the sensor measurements to identify the location of the input.

While each of the systems discussed above have had some success, each also has limitations rendering them difficult or undesirable to use. For example, many of the systems require sophisticated electronics, a very complex wiring scheme or extensive data processing. As a result, these input devices are very expensive to manufacture and integrate into the data processing systems. This is true not only for existing direct contact systems requiring a high resolution grid, but also for RF, visual and IR systems as well.

Further, the use of touch screen keyboards can be cumbersome and slow, as each letter must be "tapped in" one letter at time. More specifically, a traditional touch screen is not capable of recognizing and distinguishing between two or more "touched" locations. Touching one location, maintaining the contact, and touching another location most often produces a line from the first location to the second as the first location is released. Alternatively, the touch screen device may ignore a second touch input, or it may attempt to somehow average multiple inputs into a single input location. In other words, the ability to provide multiple simultaneous points of input is not supported as the touch screen device provides simply one X, Y coordinate pair. In addition, the "tapping action" required makes the touch screen difficult to use if the device is portable (such as a PDA, cell phone, etc.) and/or the subject is holding it while moving or standing.

Additionally, the touch screens affixed to data processing systems are neither transferable between systems, nor are they re-configurable to accommodate various applications. Moreover, a typical touch screen device provides digital signal outputs, simply informing the system that a location of X and Y coordinates is being activated—a binary "on" or "off" reporting of state. The digital signal is then processed by the data processing system in accordance with system design. While this approach may simplify the signal processing requirements of the data processing system, it prevents using the analog signal to detect real-time changes in the input pressure.

Hence, there is a need for a system and method of inputting data into a data processing system that overcomes one or more of the drawbacks identified above.

SUMMARY

The present disclosure advances the art and overcomes problems articulated above by providing a device and method for inputting data and commands into a data processing system.

In particular, and by way of example only, according to an embodiment, provided is a pressure-sensitive input device for data processing systems including: a transferable overlay having an inner surface oriented toward a supporting structure, and an outer surface spaced a distance above the inner surface; an analog controller to detect at least one analog signal generated in response to pressure exerted on the outer surface by a user input; and, a processor, in electronic communication with the transferable overlay, wherein the processor receives the analog response signal and calculates both a position of the user input on the outer surface, and a differential in pressure exerted on the outer surface by the user input.

DETAILED DESCRIPTION

Before proceeding with the detailed description, it is to be appreciated that the present teaching is by way of example, not by limitation. The concepts herein are not limited to use or application with one specific type of input device for data processing systems. Thus, although the instrumentalities described herein are for the convenience of explanation, shown and described with respect to exemplary embodiments, it will be appreciated that the principals herein may be equally applied in other types of input devices for data processing systems.

Figure 1:
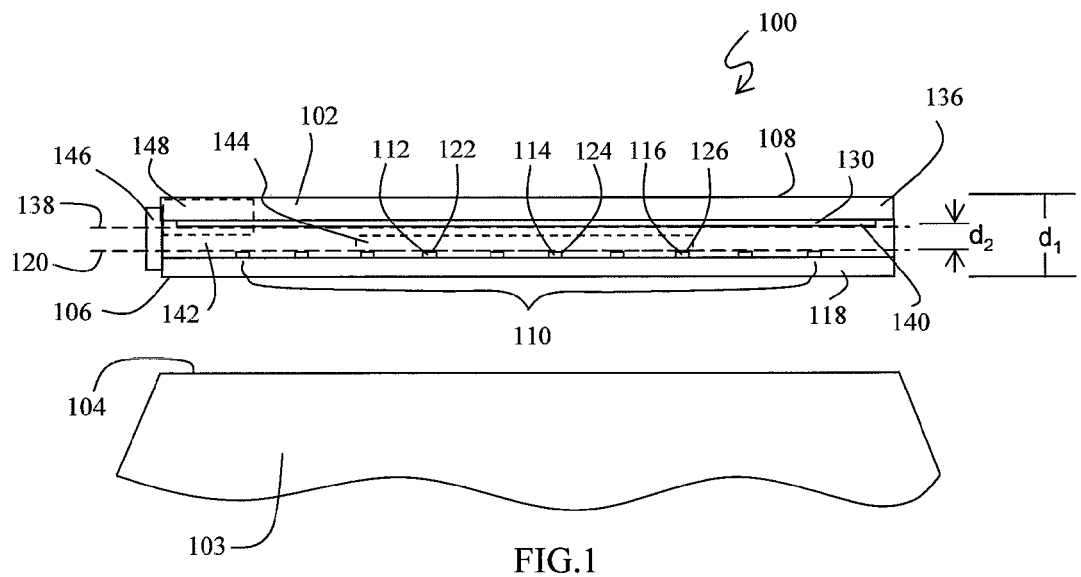
FIG. 1 is an enlarged side view of a pressure-sensitive input device for data processing systems according to an embodiment.

FIG. 1 shows a pressure-sensitive input device 100 for data processing systems. The device 100 includes a portable, flexible overlay 102 which may be transferred between and used by a variety of different data processing systems. Simply stated, an overlay is something that is laid over or covers something else, such as a support structure 103. The support structure 103 may be a display screen 104, a desk top, a counter, or other surface. In one embodiment with respect to a display screen 104, the pressure-sensitive input device 100 is overlaid to provide a user with the ability to input data upon a display generated field of icons or symbols. In an alternative embodiment with respect to a desk, table, counter, user's lap or other relatively flat surface, the pressure-sensitive input device 100 is overlaid upon that surface to provide a user with a versatile input device capable of acting as a touchpad, keyboard, tablet, or customized device.

As may be compatible with a particular system design, the overlay 102 may simply be placed on top of the display screen 104. Alternatively, the overlay 102 may be secured to the screen 104 by any of a number of attachment schemes known in the art, e.g. mechanical fasteners. In at least one embodiment the pressure-sensitive input device 100 is of substantially the same dimensions as the display screen 104 upon which it is overlain.

Figure 7:
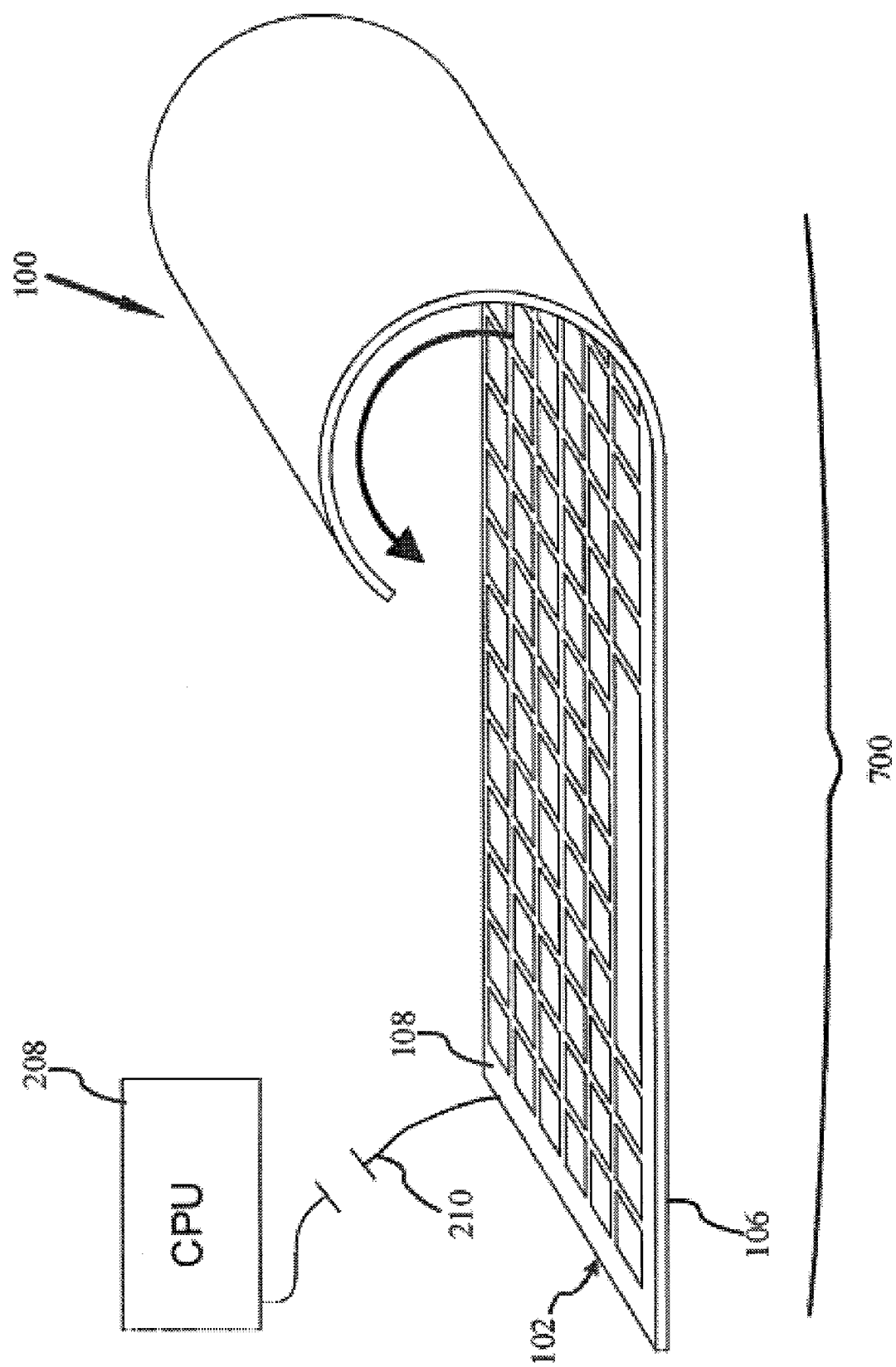
FIG. 7 is a perspective view of the pressure-sensitive input device being rolled up.

As indicated above, in an alternative embodiment, the overlay 102 may be placed in close proximity to the data processing system, over a portion of a desktop or other surface capable of supporting the overlay 102. In this configuration, the overlay 102 may be a roll-up keyboard 700 (see FIG. 7) or simply a flexible touchpad. However, as is discussed in further detail below, the analog output corresponding to applied pressure as well as the ability to provide information on multiple points of simultaneous contact provide advantages over such traditional touch pads, keyboards and the like.

The overlay 102 includes an inner surface 106 which is oriented towards and may contact the supporting structure 103, e.g. the display screen 104. Additionally, the overlay 102 has an outer surface 108 for receiving a user input. The outer surface 108 may be substantially transparent for those embodiments wherein the overlay 102 is placed over a display screen 104. Alternatively, the outer surface 108 may include a pattern, such as a keyboard, printed directly on the outer surface 108. In yet an alternative embodiment, a variety of removable visual patterns (such as, but not limited to, a keyboard, touchpad, interactive map, or game controller) may be provided for selection by a user and subsequent placement upon overlay 102.

Of note, when the device 100 is not subject to a user input, the outer surface 108 is positioned a known distance "$d_1$" from the inner surface 106. As is discussed in greater detail below, the distance "$d_1$" may vary for at least a portion of surfaces 106 and 108 as pressure is exerted on surface 108 by a user providing input.

Still referring to FIG. 1, a plurality of parallel conductive columns 110, of which columns 112, 114 and 116 are exemplary, are disposed within the overlay 102, in proximity to the inner surface 106. As shown in FIG. 1, the conductive columns 110 are mounted on a semi-rigid base substrate 118 so as to define a plane represented by dotted line 120. More specifically, the conductive columns 110 are mounted on the base substrate 118 such that the top surfaces 122, 124, and 126 of columns 112, 114 and 116, respectively, are oriented towards the outer surface 108.

Figure 2:
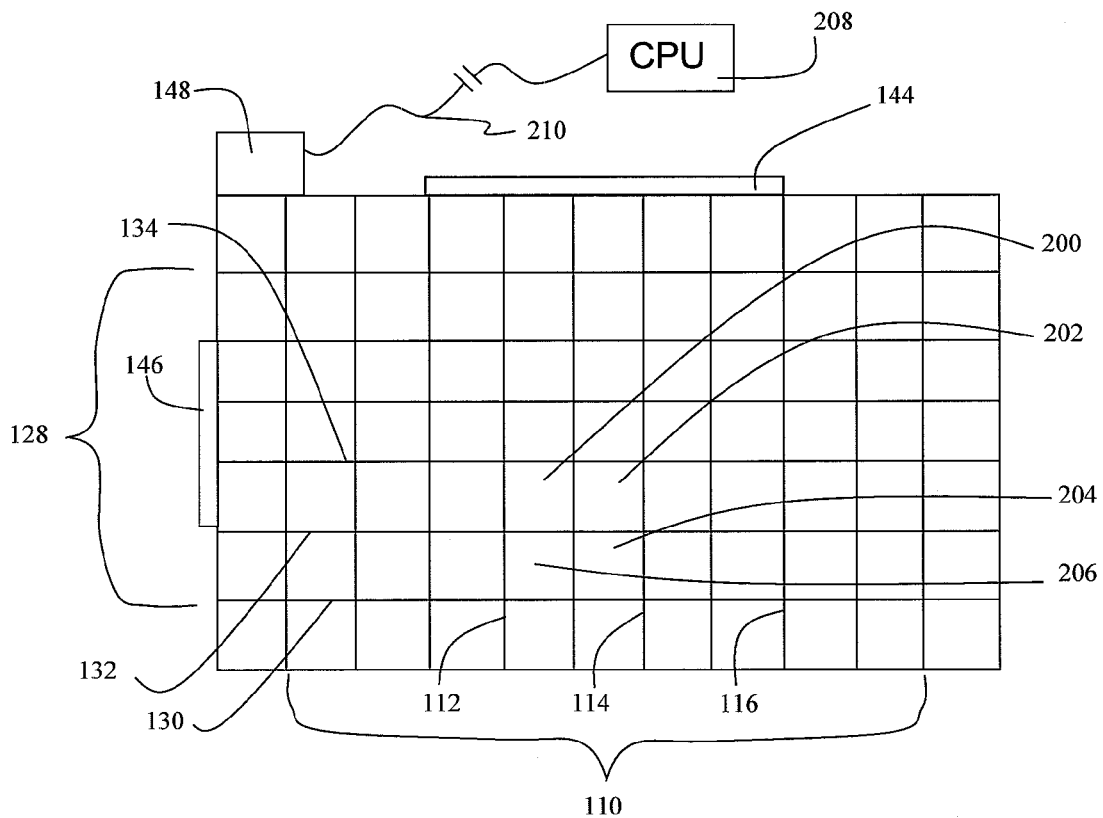
FIG. 2 is a top view of the device shown in FIG. 1, further showing the placement of electrical components and one orientation of conductive columns and conductive rows.

Cross-referencing for a moment FIG. 1 and FIG. 2, the overlay 102 also includes a plurality of parallel conductive rows 128, of which row 130 in FIG. 1 and rows 130, 132, and 134 in FIG. 2 are exemplary. The conductive rows 128 are mounted on a flexible cover substrate 136 so as to define a plane represented by dotted line 138. Further, conductive rows 128 are mounted such that their top surfaces, of which surface 140 is exemplary, are oriented toward surfaces 122, 124 and 126.

When the device 100 is in a relaxed state, which is to say not subject to a user input, the planar surface 120, defined by conductive columns 110, is positioned a known distance "$d_2$" from the planar surface 138, defined by conductive rows 128. Moreover, in at least one embodiment, the planes 120, 138 may be parallel.

In one embodiment, the conductive columns 110 and conductive rows 128 are ridges formed into the base substrate 118 and cover substrate 136 respectively. In this embodiment, the top surfaces 122, 124, 126 and 140 are conductive and may be substantially translucent. More specifically, the top surfaces 122, 124, 126 and 140 may be coated with Indium Tin Oxide (ITO), providing substantially translucent conductors.

Referring back to FIG. 1, a deformable isolation layer 142 is disposed in the space between conductive columns 110 and conductive rows 128. The degree of isolation provided is relative to the amount of deformation incurred as a result of a user applying pressure to at least one location upon the outer surface 108. In other words, in a relaxed state, the isolation layer 142 will have an initial property of isolation. However as a user applies pressure to outer surface 108, and thereby deforms outer surface 108, at least one row, and isolation layer 108, the isolation property will diminish. The isolation layer 142 may be a viscous fluid which deforms under pressure from a user input. Specifically, the viscous fluid radially disperses from the general area of the user input as pressure is applied to outer surface 108.

Alternatively, the isolation layer 142 may be a polymer membrane that deforms linearly with pressure. When the device 100 is not in use, and accordingly is not receiving pressure from a user input, the isolation layer 142 maintains the distance "$d_2$" between conductive columns 110 and conductive rows 128.

Moreover, in this non-operative configuration, the isolation layer 142 may act as a dielectric. Under the pressure of a user input, however, conductive rows 128 move toward conductive columns 110. As such, the isolation layer 142 deforms and the distance "$d_2$", at least in the vicinity of the user input, decreases. As portions of the isolation layer 142 compress under pressure, the layer 142 may become locally conductive in those areas of compression. Alternatively, the layer 142 may become non-conductive as the pressure exerted by a user input relaxes. More specifically, conductive rows 128 move away from conductive columns 110, and the distance "$d_2$" increases. In this condition, the conductivity of the isolation layer 142 decreases in proportion to the increase in "$d_2$".

Referring again to FIG. 2, conductive columns 110 and conductive rows 128 are mounted in the overlay 102 such that conductive columns 110 cross conductive rows 128. In the embodiment shown, conductive columns 110 are oriented substantially orthogonal to conductive rows 128, however, a right angle relationship between conductive rows 128 and conductive columns 110 is not required, and indeed may not be desired depending on the specific application.

The crossing patterns of parallel conductive columns 110 and parallel conductive rows 128 define a plurality of pixels, of which pixels 200, 202, 204 and 206 are exemplary. The number of conductive columns 110 and conductive rows 128 can be varied depending on the specific application for the device 100. In particular, the degree of resolution required for locating a user input, or for determining the magnitude of the pressure exerted on outer surface 108, dictates the number of rows and columns required, and hence the size and number of pixels.

For applications requiring a high degree of resolution or pressure sensitivity to locate the user input on the outer surface 108, such as for stylus inputs of hand written text, a large number of closely arranged conductive columns 110 and conductive rows 128 may be required at a minimum achievable resolution. With a large number of columns 110 and rows 128, there is a large number of pixels and potential intersection points between the columns 110 and rows 128. In this configuration, the location of the user input may be very precisely determined.

Alternatively, for those applications requiring less accuracy when locating the input, only a few columns 110 and rows 128 may be required, and the size of each pixel 200, 202, 204, and 206 increases. In this configuration, the overlay 102 may be transparent or semi-transparent. In either case, i.e. large or small pixels, it is possible to achieve a semi-transparent touch screen via the use of Indium Tin Oxide, one of the known few transparent conductive materials. Other transparent conductive materials may also be used such as, for example ZnO as well as certain organic and doped semiconductor materials. Depending upon the thickness of the conductor, to some extent, conductors made with common materials such as Al, Au, Cu, or the like may also be used to provide conductors of sufficiently small and thin size so as not to be visually obvious or intrusive. In other words the conductors may be designed to have small enough thicknesses and small enough widths that they are either nearly transparent and/or the loss of light due to absorption is minimal.

The device 100 further includes a controller 144 (shown in phantom in FIG. 1 and more clearly in FIG. 2) in electronic communication with conductive columns 110. The controller 144 is of a type well known in the pertinent art for conducting a current across a conductive surface or plurality of conductive columns, such as columns 110. Additionally, the controller 144 is positioned to sense analog response signals transmitted from the overlay 102 along at least one conductive column, e.g. 112. Likewise, controller 146 is in electronic communication with conductive rows 128. Similar to controller 144, controller 146 acts to selectively conduct a current across conductive rows 128. Further, the controller 146 is positioned to receive at least one analog response signal transmitted along any or all of the conductive rows 128. The analog response signals transmitted to the controllers are generated by the movement of conductive rows 128 toward conductive columns 110 in response to a user input.

It can be appreciated that controller 144 and controller 146 may receive multiple inputs, or multiple simultaneous inputs along columns 110 and rows 128 respectively. Stated differently, the device 100 may detect and report separate and distinct X and Y coordinate locations of multiple user inputs. The multiple X and Y coordinate locations are used by the software of the system as separate input signals.

In addition to the controllers 144 and 146, the device 100 includes a processor 148 in electronic communication with controller 144 and controller 146. The processor 148 is positioned to receive at least one analog signal transmitted from the conductive columns 110 and the conductive rows 128, through controllers 144 and 146 respectively. More specifically, the analog signals are generated in response to a user input on the outer surface 108. The pressure of the input induces rows 128 to move toward the columns 110, reducing the distance "$d_2$". The device generates an analog signal indicative of a change in current flow across the columns 110 and rows 128, and the signal is transmitted to the processor 148. As shown in FIG. 2, the processor 148 is electronically connected to a CPU 208 of the data processing system, via electrical cable 210. The processor transmits to the CPU 208 an analog signal corresponding to a function, command or operation of the data processing system.

In yet another embodiment of the device, sensors (not shown) may be disposed at the cross-points of the columns 110 and rows 128 to detect strain forces generated by a user input. More specifically, the sensors may be strain gauges, piezoelectric transducers, or other gauges well known in the art for detecting mechanical strain. The positioning of gauges at the cross-points of the columns 110 and rows 128 provides for precise locating of multiple user inputs.

Figure 3:
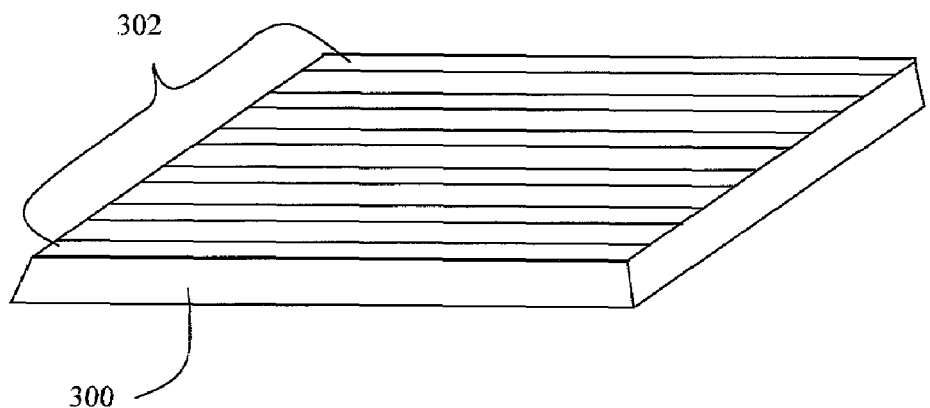
FIG. 3 is a perspective view of a plastic substrate with embedded conductive columns, before and after manufacturing grooves and ridges into the substrate.
Figure 3:
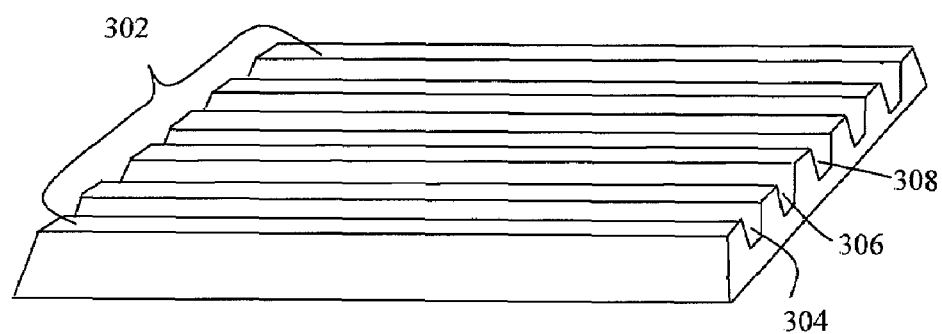
Figure 3:
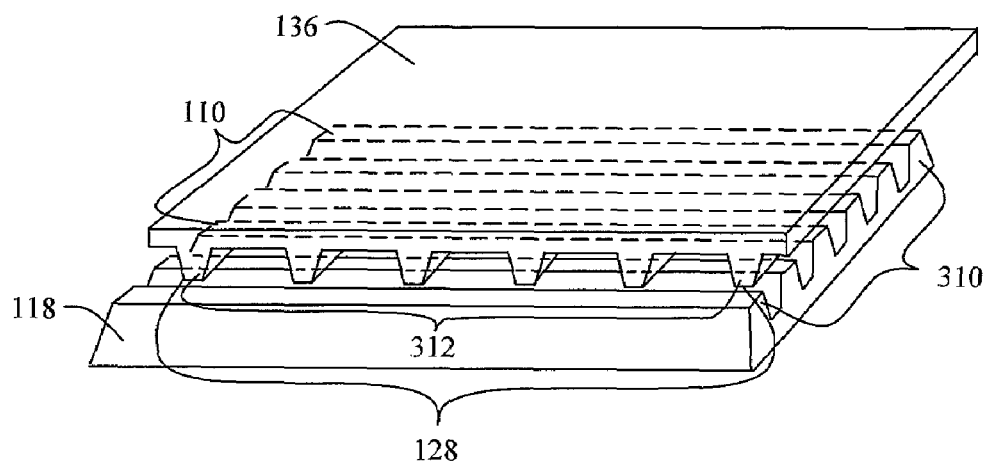

In the manufacture of conductive columns 110 and conductive rows 128, a number of different material processing solutions may be employed. For example, as shown in FIG. 3, a plastic film 300 with embedded metal traces 302 can serve as the base substrate 118. The film 300 can be stamped or modified through imprint lithography to create grooves in the film 300, such as grooves 304, 306 and 308.

The resultant ridges 310 with metal traces 302 constitute the parallel conductive columns 110. Similarly, the parallel conductive rows 128 can be manufactured as ridges 312 using the same or similar processes. In addition to a plastic film, glass may be used to manufacture one or both of the substrates 118, 136. In this embodiment, the grooves 304, 306, and 308 and ridges 310, 312 may be etched in the glass through any one of a number of techniques well known to the skilled artisan.

To state it another way, in at least one embodiment the overlay 102 has within it a first plurality of substantially parallel ridges 310. Each ridge has a conductive top providing a conductive column. A second plurality of substantially parallel ridges 312 is also provided, each ridge of the second plurality again having a conductive top providing a conductive row. The second plurality of ridges 312 is aligned to cross, but not contact the first plurality of ridges 310. Which set of ridges is disposed upon the inner surface 106 and which set of ridges is disposed upon the outer surface 108 is a matter of fabrication preference.

It is realized that applying a metal trace upon a flat substrate may provide a metal ridge in some cases. However, as set forth herein, the height of ridge is understood to be significantly greater than the mere thickness of a disposed conductive line. In at least one embodiment, the conductive rows may be referred to as conductive ridge rows and the conductive columns may be referred to as conductive ridge columns.

In an alternative embodiment, providing a substantially transparent device is accomplished with the use of a flexible and transparent substrate or film 300. As may be provided by roll-to-roll processing, imprint lithography, photo lithography, or other process, a plurality of substantially parallel ridges 310 may be established across the surface of the transparent substrate 300.

Each defined ridge may then be coated with ITO to provide a translucent conductor. By selecting a small dimension for the cross section of the ridges 310, the translucent nature of the ITO conductor yields a substantially transparent set of rows 128 or columns 110 under normal operating conditions. As shown in FIG. 3, the two substrates 118 and 136 can be oriented such that the conductive columns 110 and conductive rows 128 cross. It can be appreciated that the ridges 310, 312 may be trapezoidal shaped, as shown in FIG. 3, or the may be terraced, spiral shaped, etc.

Figure 4:
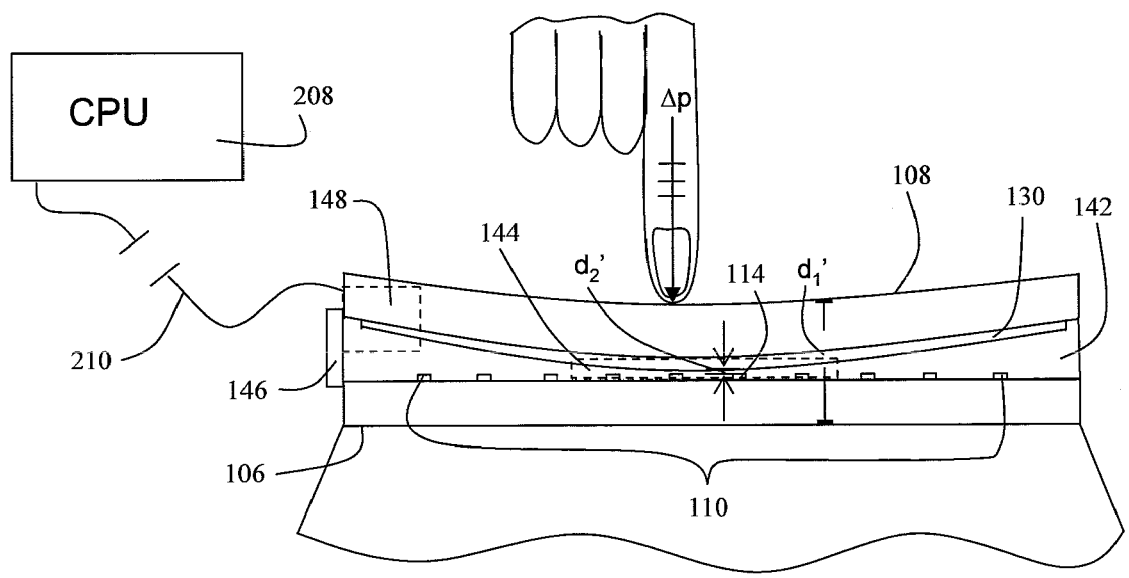
FIG. 4 is an enlarged side view of the device shown in FIG. 1 receiving a user input.

In the operation of the device 100, a user inputs pressure (?p) on the outer surface 108, as shown in FIG. 4, using a finger or other input apparatus, e.g. a stylus. The outer surface 108, conductive row 130, and isolation layer 142 deform as a result of the pressure (?p) exerted on the surface 108 by the input. As can be appreciated by referring to FIG. 4, the distance between the outer surface 108 and inner surface 106, $d_1'$, decreases proportional to the pressure exerted on the surface 108. Likewise, the distance between planes 120 and 138, $d_2'$, decreases as well.

As the distance, $d_2'$, decreases, the uniform flow of current across conductive row 130 and one or more conductive column, e.g. 114 is altered in the vicinity of the user input. Stated differently, the electric field associated with the flow of current along conductive row 130 interacts locally with the field generated by the flow of current along column 114, and the interactions disrupt and alter the flow of currents in the localized area.

The changes in current flow are sensed by the controllers 144 and 146, and each controller may receive at least one analog signal proportional to the change in current flow across the column 114 and row 130 respectively. It can be appreciated that the magnitude of the changes in current flow are proportional to the distance between the column 114 and row 130, which in turn is proportional to the input pressure. The analog response signals are transmitted to the processor 148, which processes the signals and calculates the X and Y coordinate location of the user input. The location information is transmitted to the CPU 208 of the data processing system, via cable 210, and used by the system software to command corresponding system operations or to input data.

Figure 5:
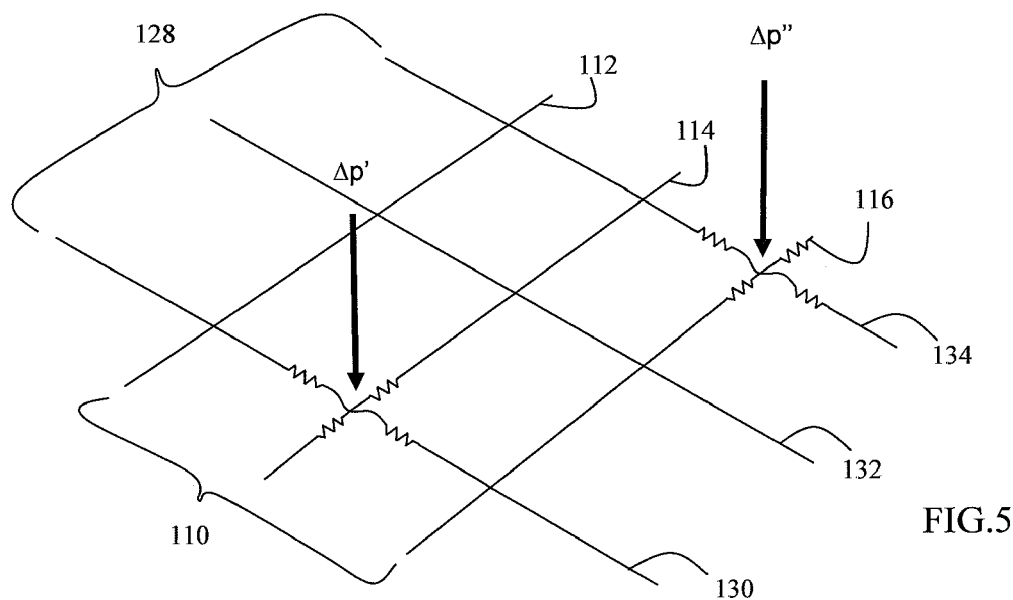
FIG. 5 is a schematic representation of the increased resistance between conductive columns and rows induced by multiple, simultaneous inputs, in an embodiment of the device.

Referring now to FIG. 5, the localized alteration in current flow resulting from multiple inputs is depicted. The inputs may be either simultaneous or sequential. As the pressures ?p' and ?p" are exerted on the outer surface 108, the rows 130 and 134 deform and move toward columns 114 and 116 respectively. The ridge design of the rows 128 limits the deformation of rows 130 and 134 to the local area beneath the input pressures ?p' and ?p". More specifically the ridge distorts locally whereas if each substrate 118, 136 was substantially flat, the distortion would spread. The ridge design therefore permits asymmetric deformation, and therefore enhanced precision and detection then would otherwise be achieved with non-ridged substrates.

Localizing the distortion permits greater resolution and greater recognition of the degree of distortion. In the embodiment shown, the resistance increases in the localized areas of deformation. The flow of current along the remainder of rows 130 and 134, and columns 114 and 116, is substantially unaffected by the input pressures ?p' and ?p".

The uniform flow of current along row 132 and column 112 is substantially unaffected as well. The controllers 144 and 146 sense each increase in resistance separately, and calculate the distinct X and Y coordinate locations of each input. In this manner, inputs at multiple locations can be detected and used to control the operations of the data processing system. This is true even if the inputs are simultaneous.

Figure 6:
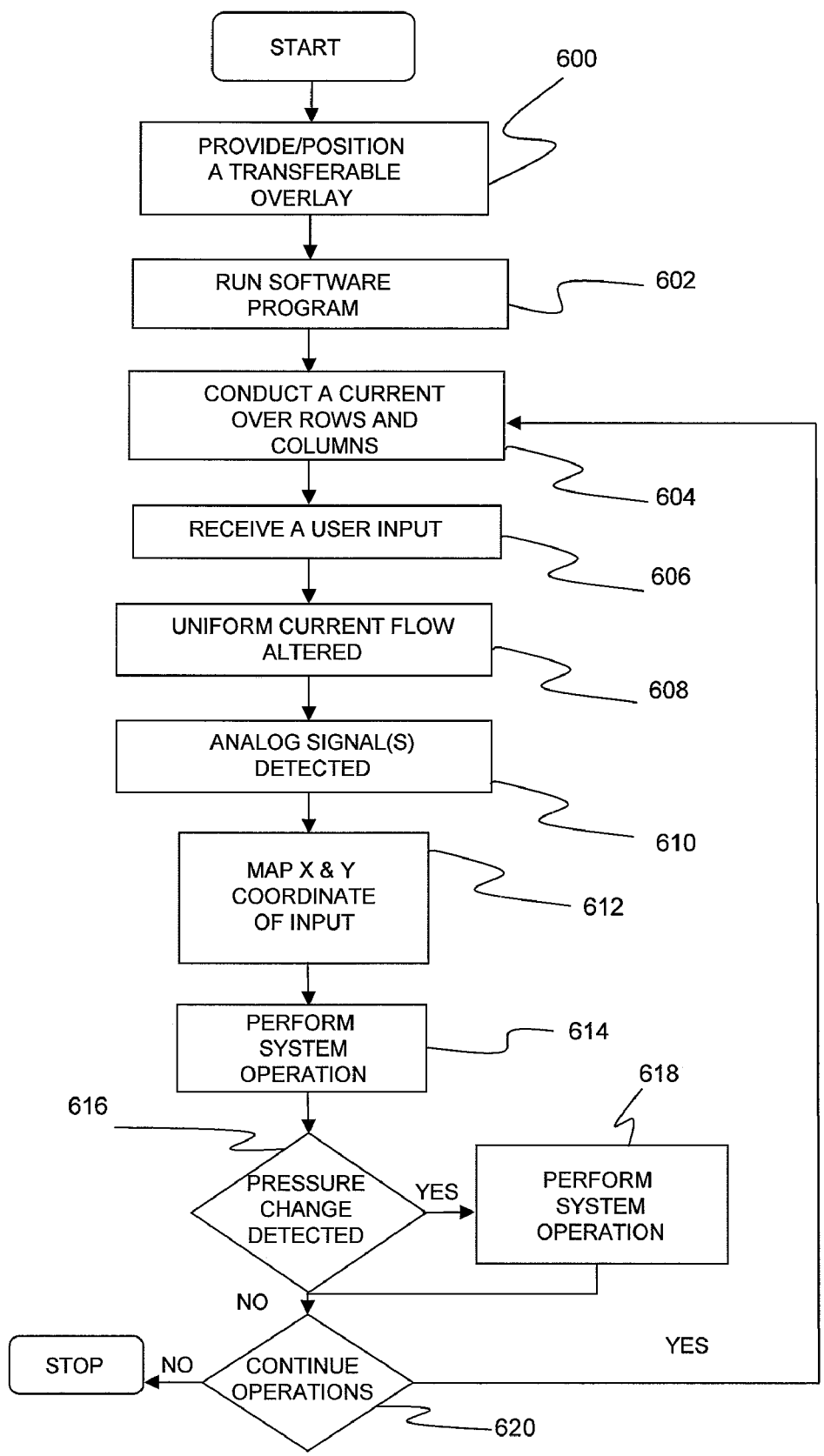
FIG. 6 is a flowchart illustrating a method for inputting information into a data processing system using a pressure-sensitive input device, according to an embodiment.

The flowchart of FIG. 6 is provided to summarize at least one embodiment for inputting data or commands into a data processing system using the pressure-sensitive input device 100. It will be appreciated that the described process need not be performed in the order in which the process for inputting is herein described, but that this description is merely exemplary of at least one preferred method of inputting data or commands using the input device 100. The process discussion below makes reference to structural elements shown and identified in FIGS. 1-3 above.

In at least one embodiment, the input process is commenced by providing the flexible, transferable overlay, block 600. The overlay may be placed over a display screen of a data processing system, positioned such that the inner surface of the overlay contacts the display screen. Alternatively, the overlay may be placed on a desktop or other supporting structure in close proximity to the data processing system. In one embodiment, the overlay may be repositioned from a display screen to a desktop and back again during use, depending on the requirements and preferences of the user. When properly positioned, the outer surface of the overlay is oriented so as to receive at least one user input.

As the overlay 102 is flexible, in certain embodiments it may be rolled up (see FIG. 7) for easy storage and transport. This flexible nature and ease of storage may have certain advantages such as the ability to provide a large user input device, such as a drawings template, for a small data processing system, such as a PDA. A traveling user may also enjoy the ability to provide a full-sized keyboard 700 for use at an opportune moment and then roll up the keyboard 700 for compact storage.

As shown in block 602, once the overlay is properly positioned, a software program is run on the data processing system. The software program registers conductive columns and conductive rows, similar to a standard calibration routine for a PDA stylus. The software program may also configure the output display presented on the display screen for those embodiments wherein the output display is viewed by the user through a substantially transparent overlay. In this way, the user may tailor the display to present a preferred layout of keystrokes, to control the pressure sensitivity for a particular key or input icon, or to incorporate other user specific input requirements.

In one embodiment, when the device 100 is configured to operate in a resistive/conductive mode, the controllers conduct current across the columns and rows, block 604. More specifically, the conduction of current alternates between the columns and the rows. In this mode of operation, the current may be switched between the columns and rows at a frequency in the range of several thousand times each second.

When a user input is received (block 606) on the outer surface, the outer surface, the conductive rows and the isolation layer move and deform under the pressure of the input. Multiple user inputs may be received. Multiple inputs may represent a variety of keystrokes, icons or other command functions input sequentially or simultaneously, in varying combinations.

As the deformation occurs, the distance between the rows and columns decreases locally in the vicinity of the input. As the conductive columns and conductive rows are forced closer together by the input pressure, the uniform flow of current along the columns and rows is altered, and the resistance in the conductive columns and rows increases locally, block 608. Due to the increase in resistance across the conductive columns and conductive rows, at least one analog signal is generated and subsequently detected by the controllers, block 610. More specifically, an analog response signal proportional to the change in current flow across the conductive columns, which in turn is proportional to the user input pressure, may be transmitted to a controller.

Similarly, an analog response signal may be transmitted from the conductive rows to a controller. This analog response signal may be understood and appreciated as both a recognition of an event at a user selected X and Y coordinate, and the degree of that event, such as the pressure applied. The controllers receive the analog response signals and transmit the signals to the processor. In at least one embodiment, the device 100 provides the processor with multiple analog signals corresponding to multiple instances of substantially simultaneous user inputs.

In the processor, the analog response signals are used to calculate a location of the input (block 612). The location is typically expressed in terms of a "X" coordinate and a "Y" coordinate of a coordinate system arbitrarily assigned to the array defined by the columns and rows. The location of the user input, in turn, corresponds to a particular data input, command function, or other input requirement for the data processing system.

The input location information is transmitted to the CPU and used to command a system operation or to input data (block 614). As discussed above, multiple user inputs may occur at multiple locations, either simultaneously or sequentially, on the outer surface of the overlay. Software in the controller and the processor processes each input separately and the system responds accordingly. In certain embodiments, this improvement over devices found in the prior art allows for more rapid and sophisticated input of data and commands into the data processing system.

In addition to determining the location of a given user input, the device 100 detects changes in the magnitude of the pressure input, block 616, and uses that information to command certain functions in the data processing system (block 618). For example, if the analog response signals received by the processor indicate that the user input pressure at a known location is increasing, this pressure proportional output can be coupled with emotive typing to "BOLD" a previously typed letter.

Other examples of where an increasing or decreasing pressure input would be advantageous include scrolling through a menu at varying speeds, accelerating or decelerating an object in a video game, or turning electronic pages. The applications are by way of example only, and are in no way a limitation on the potential uses for the pressure proportional output. After commanding certain system operations based on the analog signals received, the final step in the process, as shown in block 620, is to determine if additional user inputs are being received, wherein the inputs would be indicative of continued operations.

In another embodiment of the present device 100, the flow chart steps of receiving a user input through performing computer operations (blocks 606 through 618) remain the same, however, the operative mode of device 100 is different. With a capacitive mode device 100, a constant, uniform voltage is continually passed across conductive columns and conductive rows.

When the outer surface is touched by a capacitive input device (e.g. a finger or a metal tipped stylus), current is drawn to the location of the user input. The resulting changes in the uniform voltages are detected in the form of analog response signals transmitted to the controllers. As with the resistive/conductive embodiment discussed above, the location of the input or inputs, and the magnitude of the input pressures, can be detected and used by the device 100 to command data processing system functions. Additionally, multiple simultaneous user inputs can be detected and used to command system functions.

In yet another embodiment of the device, the analog response signals used to locate a user input and identify changes in the input pressure are generated by sensors embedded in the overlay at the cross-points of the columns and rows. The methods for mapping the X and Y coordinates, commanding system operations, and determining if the input pressure is changing are substantially the same as those described in FIG. 6.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A pressure-sensitive input device for data processing systems comprising:
    a transferable overlay having:
        an inner surface oriented toward a supporting structure, and an outer surface spaced a distance above the inner surface;
        a plurality of substantially parallel conductive columns disposed within the transferable overlay proximate to the inner surface;
        a plurality of substantially parallel conductive rows disposed within the transferable overlay proximate to the outer surface and oriented to cross the conductive columns; and
        a deformable isolation layer, disposed between the conductive columns and the conductive rows, wherein the user input deforms the isolation layer and changes a distance between the conductive columns and the conductive rows, and further wherein the change in distance between the conductive columns and the conductive rows alters a flow of current conducted across the conductive columns and conductive rows;
    a controller to detect at least one analog response signal generated in response to pressure exerted on the outer surface by a user input; and a processor, in electronic communication with the controller, wherein the processor receives the analog response signal and calculates both a location of the user input on the outer surface, and a differential in pressure exerted on the outer surface by the user input.

2. The input device of claim 1, further comprising a plurality of sensors mounted within the transferable overlay to detect the user input, at least one sensor transmitting the analog response signal to the controller in response to the user input.

3. The input device of claim 1, wherein the overlay is a roll-up keyboard positioned in close proximity to the data processing system.

4. The input device of claim 1, wherein the supporting structure is a display screen of the processing system.

5. The input device of claim 1, wherein the conductive columns comprise a first plurality of ridges, each ridge of the first plurality of ridges having a conductive top surface substantially parallel to the inner surface, and further wherein the conductive rows comprise a second plurality of ridges, each ridge of the second plurality of ridges having a conductive top surface substantially parallel to the outer surface and oriented toward the top surfaces of the first plurality of ridges.

6. The input device of claim 1, wherein the plurality of conductive rows defines a plane substantially parallel to a plane defined by the plurality of conductive columns.

7. The input device of claim 1, wherein the plurality of conductive rows and plurality of conductive columns are translucent.

8. The input device of claim 1, wherein the plurality of conductive rows and plurality of conductive columns comprise Indium Tin Oxide.

9. The input device of claim 1, wherein the deformable isolation layer is an elastic polymer membrane.

10. The input device of claim 1, wherein the deformable isolation layer is a viscous fluid.

11. The input device of claim 1, wherein the deformable isolation layer is substantially dielectric in a relaxed state, and further wherein the deformable isolation layer acts as a conductor when compressed by the pressure of the user input.

12. A pressure-sensitive input device for data processing systems comprising:
an overlay having an inner surface and an outer surface spaced a distance above the inner surface;
a first plurality of substantially parallel ridges disposed upon the inner surface, each ridge having a conductive top surface providing a conductive row;
a second plurality of substantially parallel ridges disposed upon the outer surface, each ridge having a conductive top surface providing a conductive column, the second plurality of ridges crossing the first plurality of ridges;
a deformable isolation layer disposed between the conductive columns and the conductive rows; the isolation relative to a degree of deformation from pressure exerted on the outer surface by a user; and
a controller being operable to detect at least one analog response signal generated between at least one conductive row and at least one conductive column in response to pressure exerted upon the outer surface by a user input.

13. The input device of claim 12, further including a processor in electrical communication with the controller, the processor operable to receive the at least one analog signal and calculate at least one location of the user input upon the outer surface, and at least one value of pressure applied.

14. The input device of claim 12, wherein the plurality of ridges disposed upon the outer surface permits asymmetric deformation of the outer surface.

15. The input device of claim 12, wherein the plurality of conductive rows and the plurality of conductive columns comprise Indium Tin Oxide.

16. The input device of claim 12, wherein the overlay is transferable.

17. The input device of claim 12, wherein the overlay is a roll-up keyboard positioned in close proximity to the data processing system.

18. The input device of claim 12, wherein the overlay is translucent.

19. A pressure-sensitive input device for data processing systems comprising:
an analog means for detecting a user input on a transferable overlay, wherein the overlay includes:
an inner surface oriented toward a supporting structure, and an outer surface spaced a distance above the inner surface;
a plurality of substantially parallel conductive columns disposed within the transferable overlay proximate to the inner surface;
a plurality of substantially parallel conductive rows disposed within the transferable overlay proximate to the outer surface and oriented to cross the conductive columns; and
a deformable isolation layer, disposed between the conductive columns and the conductive rows, wherein the user input deforms the isolation layer and changes a distance between the conductive columns and the conductive rows, and further wherein the change in distance between the conductive columns and the conductive rows alters a flow of current conducted across the conductive columns and the conductive rows;
a means for sensing at least one analog response signal transmitted from the overlay, wherein the analog response signal is proportional to a pressure exerted by a user input on the outer surface; and
a means for processing the analog response signal to calculate both a position of the user input on the outer surface, and a differential in the pressure exerted on the outer surface by the user input.

20. The input device of claim 19, wherein the device is transparent.

21. The input device of claim 19, wherein the overlay is a roll-up keyboard positioned in close proximity to the data processing system.

22. The input device of claim 19, wherein the supporting structure is a display screen of the processing system.

23. The input device of claim 19, wherein the detecting means is a plurality of sensors disposed within the transferable overlay to detect the user input.

24. The input device of claim 19, wherein the conductive columns comprise a first plurality of ridges, each ridge of the first plurality of ridges having a conductive top surface substantially parallel to the inner surface, and further wherein the conductive rows comprise a second plurality of ridges, each ridge of the second plurality of ridges having a conductive top surface substantially parallel to the outer surface and oriented toward the top surfaces of the first plurality of ridges.

25. The input device of claim 19, wherein the deformable isolation layer is an elastic polymer membrane.

26. The input device of claim 19, wherein the deformable isolation layer is a viscous fluid.

27. The input device of claim 19, wherein the deformable isolation layer is substantially dielectric in a relaxed state, and further wherein the deformable isolation layer acts as a conductor when compressed by the user input.

28. A method for inputting information into a data processing system using a pressure-sensitive input device, the method comprising:
providing a transferable overlay having an inner surface oriented toward a supporting structure, and an outer surface spaced a distance above the inner surface, wherein a plurality of conductive columns is disposed within the overlay proximate to the inner surface, and wherein a plurality of conductive rows is disposed within the overlay proximate to the outer surface and oriented to cross the conductive columns, and further wherein the conductive columns and the conductive rows are disposed within a deformable medium therebetween;
applying pressure to at least one location on the outer surface of the transferable overlay, such that a distance between at least a portion of the conductive rows and a portion of the conductive columns is changed;
generating an analog response signal wherein the analog response signal is proportional to the change in the distance between the conductive rows and the conductive columns;
transmitting to a processor the analog response signal; and
processing the analog response signal to calculate both a location of the user input on the outer surface and a differential in pressure exerted on the outer surface by the user input.

29. The method of claim 28, wherein the deformable medium is substantially dielectric in a relaxed state, and further wherein the deformable medium acts as a conductor when compressed by the user input.

30. The method of claim 28, wherein the analog response signal is generated by at least one sensor electrically connected to the conductive rows and the conductive columns at a cross point of the conductive rows and the conductive columns.

31. The method of claim 28, wherein the supporting structure is a display screen of the processing system.

32. The method of claim 28, wherein the supporting structure is a desk, table, user's lap, or counter.

33. The method of claim 28, further comprising the step of executing a software program to configure an input display according to requirements of a user, wherein the input display is visually presented on a display screen of the data processing system and projected through the transferable overlay, which is substantially transparent.

34. The method of claim 28, wherein the conductive columns comprise a first plurality of ridges, each ridge of the first plurality of ridges having a conductive top surface substantially parallel to the inner surface, and further wherein the conductive rows comprise a second plurality of ridges, each ridge of the second plurality of ridges having a conductive top surface substantially parallel to the outer surface and oriented toward the top surfaces of the first plurality of ridges.

* * * * *